Feb. 6, 1962  J. W. MATHEWS  3,019,967
ADDING AND SUBTRACTING MACHINE WITH CREDIT
BALANCE PRINTING AND SELF ZEROING DIALS
Filed Dec. 22, 1954  8 Sheets-Sheet 1
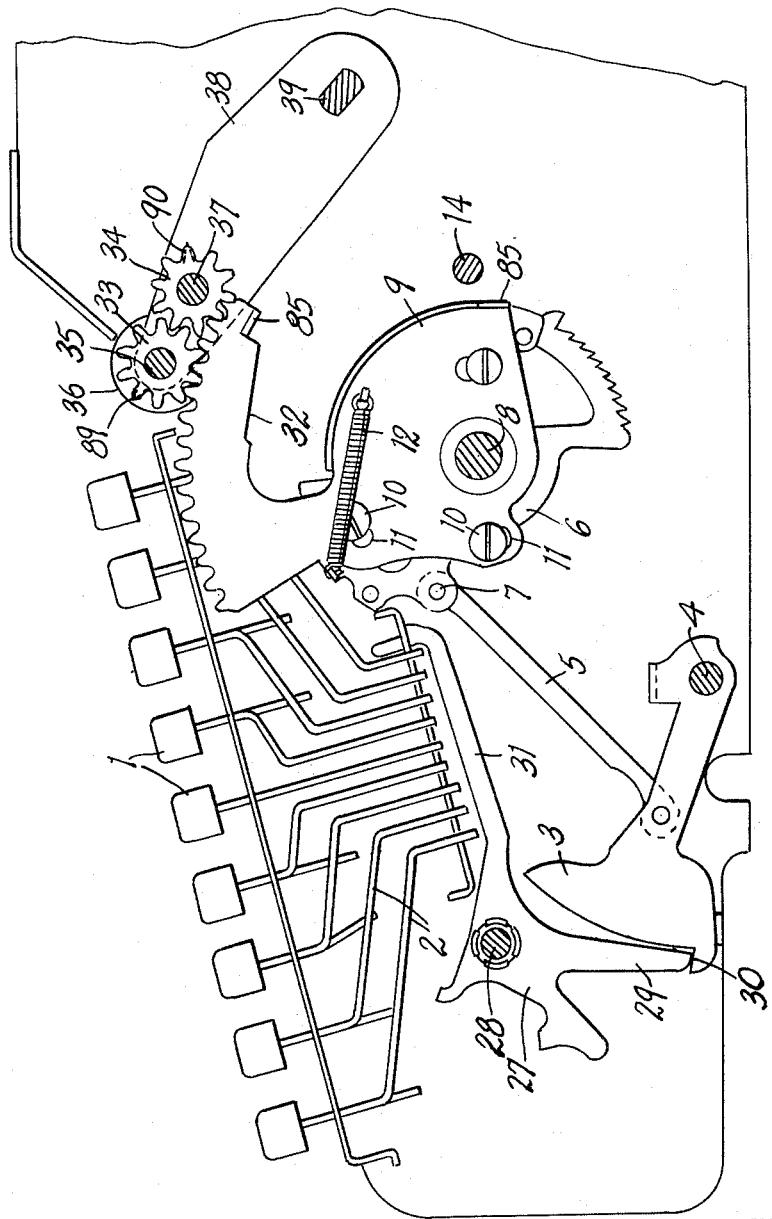
INVENTOR.
John W. Mathews
BY
Otto A. Earl
ATTORNEY.

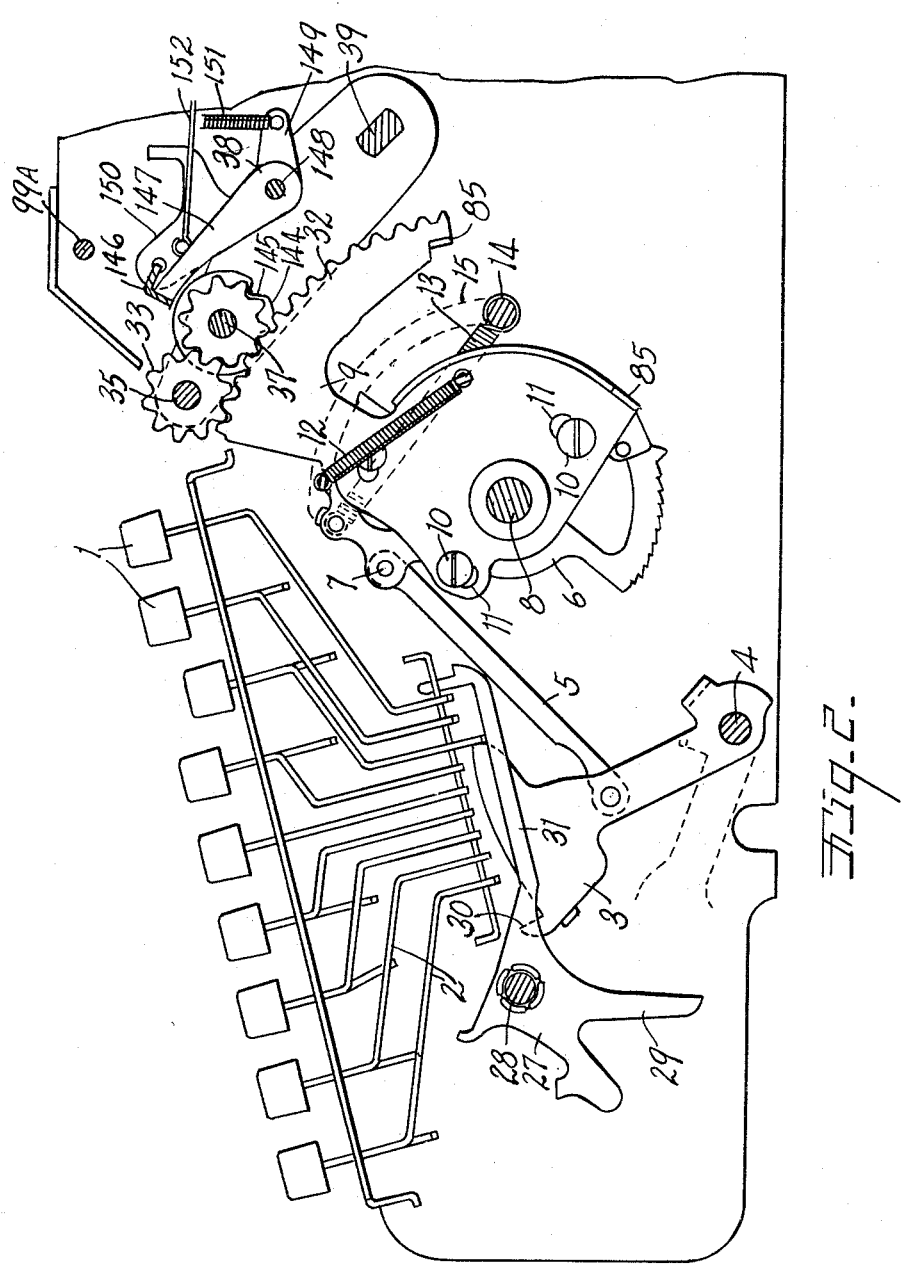

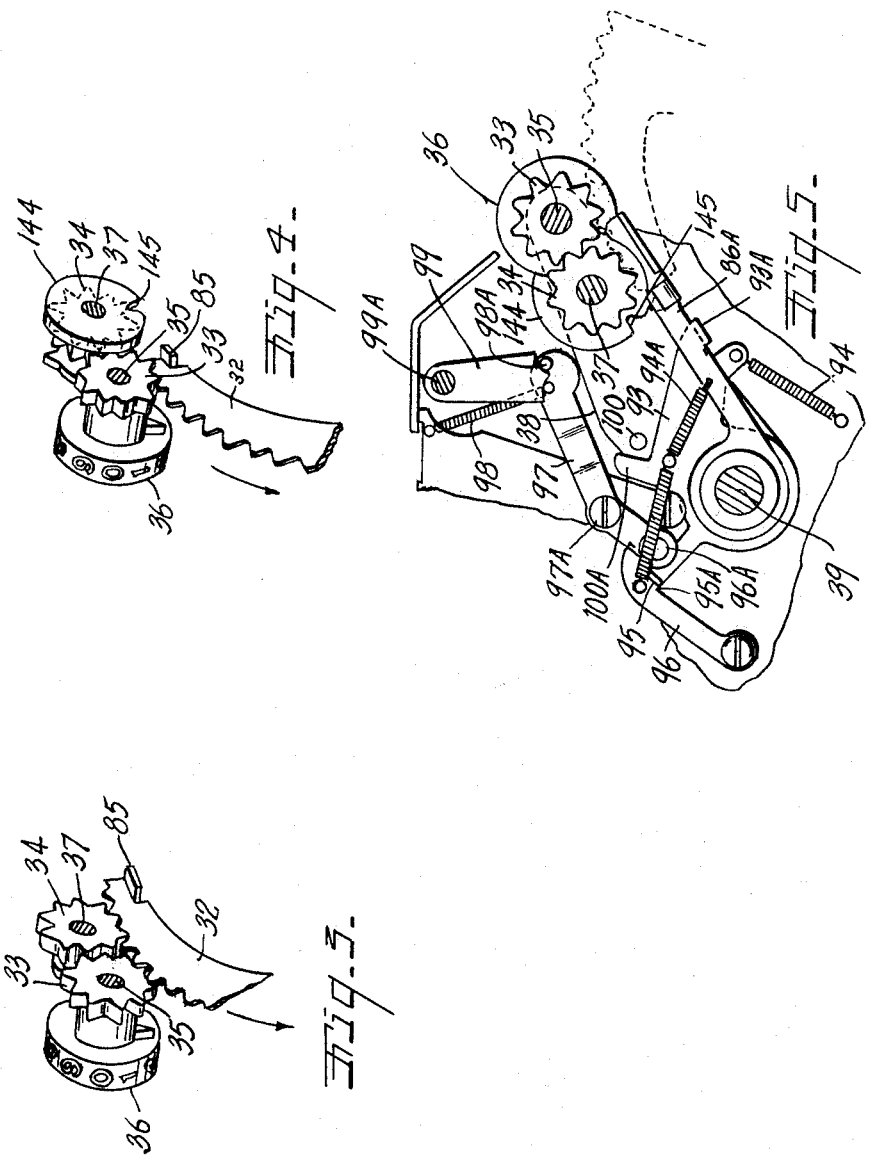

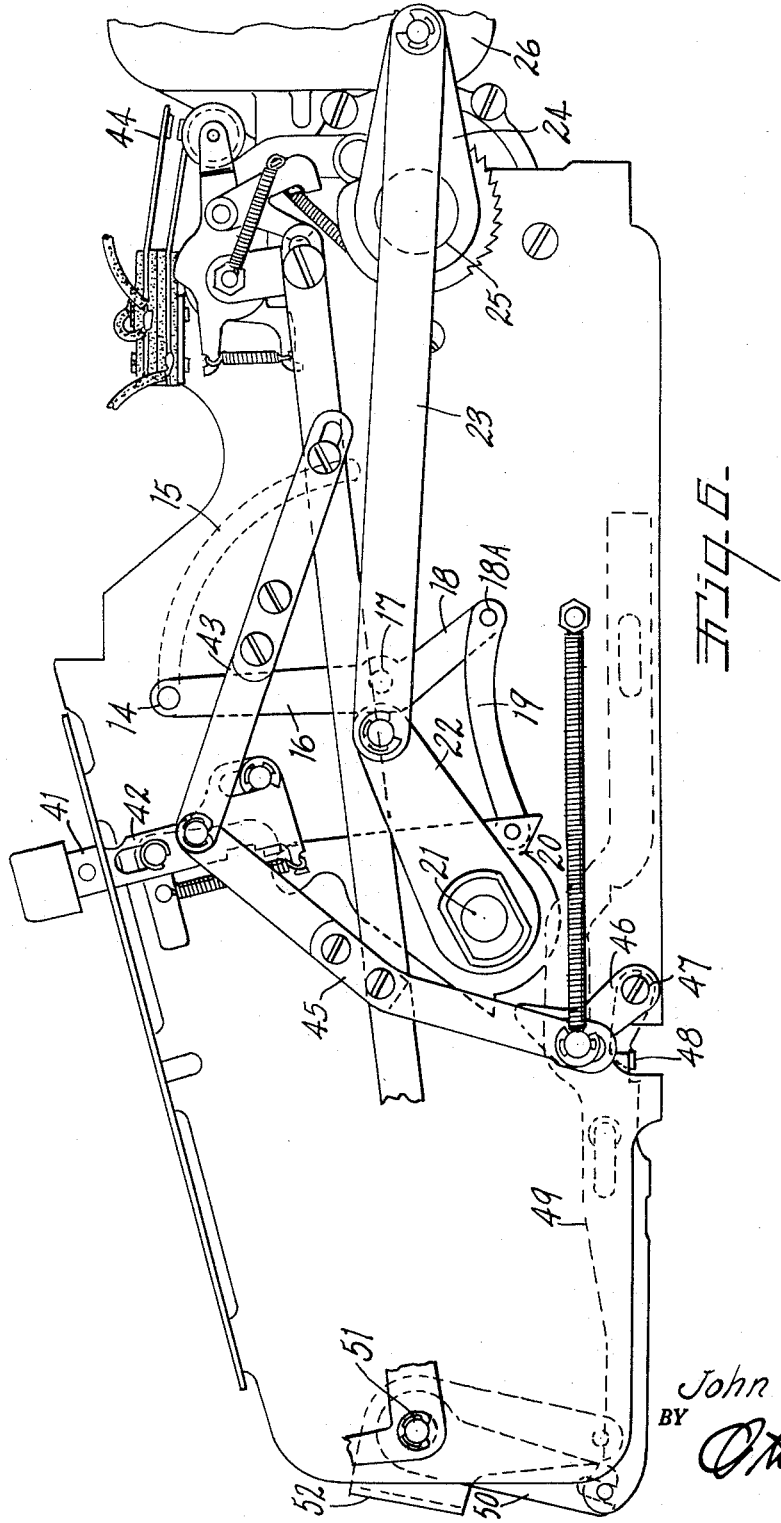

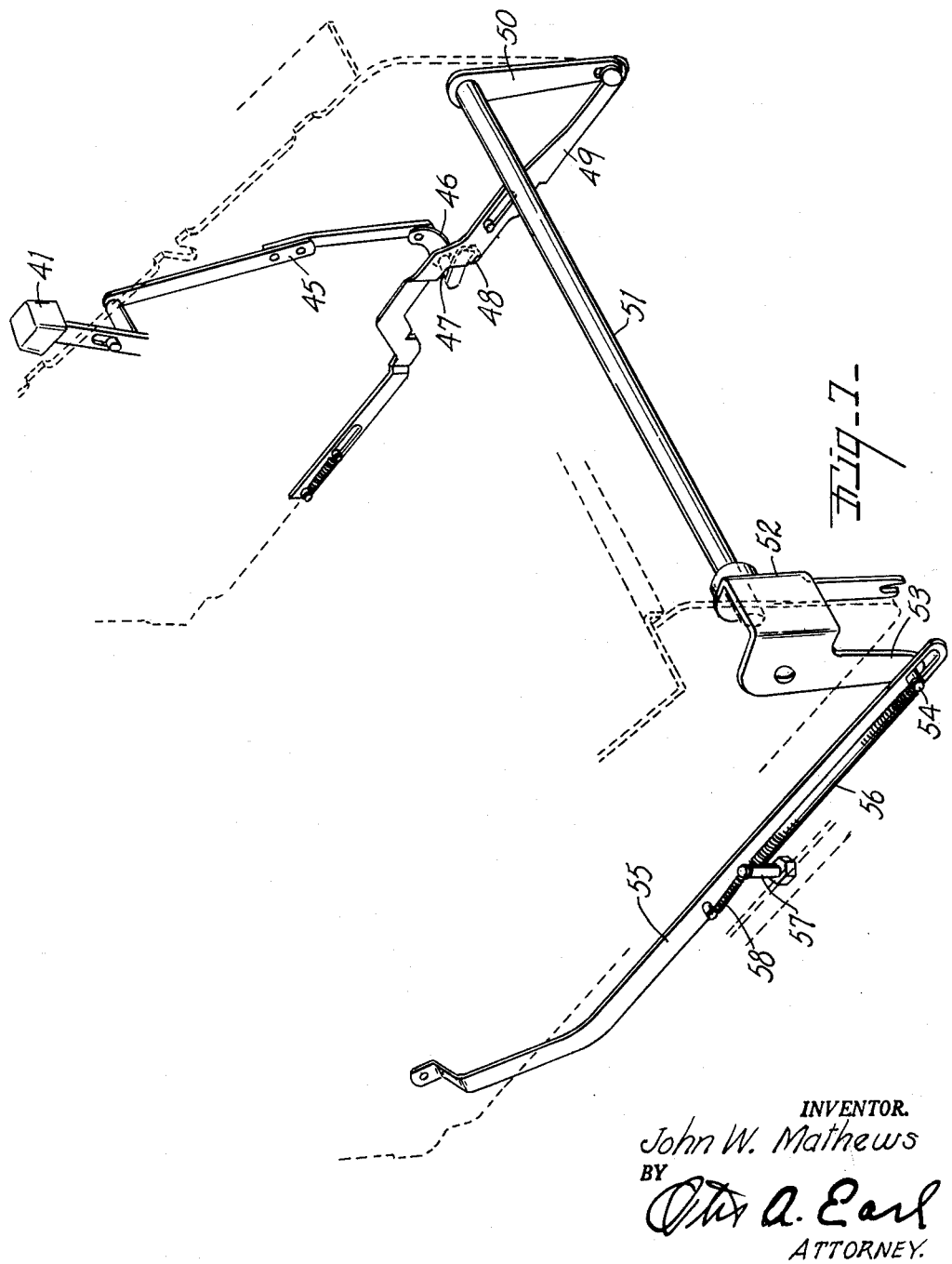

Feb. 6, 1962 J. W. MATHEWS 3,019,967
ADDING AND SUBTRACTING MACHINE WITH CREDIT
BALANCE PRINTING AND SELF ZEROING DIALS
Filed Dec. 22, 1954 8 Sheets-Sheet 6

INVENTOR.
John W. Mathews
BY
Otis A. Earl
ATTORNEY.

Feb. 6, 1962 J. W. MATHEWS 3,019,967
ADDING AND SUBTRACTING MACHINE WITH CREDIT
BALANCE PRINTING AND SELF ZEROING DIALS
Filed Dec. 22, 1954 8 Sheets-Sheet 7
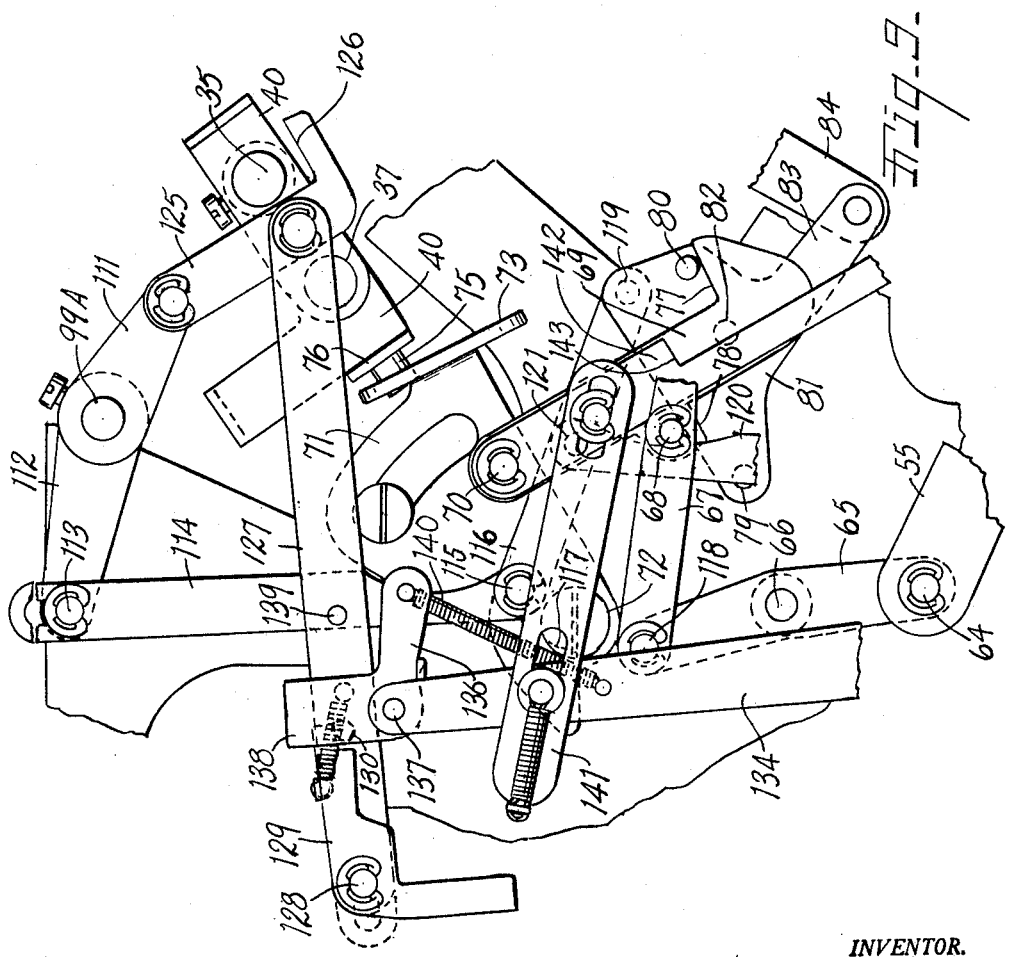
INVENTOR.
John W. Mathews
BY
ATTORNEY.

Feb. 6, 1962 J. W. MATHEWS 3,019,967
ADDING AND SUBTRACTING MACHINE WITH CREDIT
BALANCE PRINTING AND SELF ZEROING DIALS
Filed Dec. 22, 1954 8 Sheets-Sheet 8

INVENTOR.
John W. Mathews
BY
Otis A. Earl
ATTORNEY.

United States Patent Office 3,019,967
Patented Feb. 6, 1962

3,019,967
ADDING AND SUBTRACTING MACHINE WITH CREDIT BALANCE PRINTING AND SELF ZEROING DIALS
John W. Mathews, Holland, Mich., assignor to R. C. Allen Business Machines, Inc., Grand Rapids, Mich.
Filed Dec. 22, 1954, Ser. No. 476,884
18 Claims. (Cl. 235—60.17)

This invention relates to improvements in adding and subtracting machines with credit balance printing and self zeroing dials.

The principal objects of the invention are:

First, to provide mechanism for automatically zeroing the dials of a credit balance indicating adding and subtracting machine upon taking a total and clearing the accumulator of the machine.

Second, to provide means for automatically actuating the carry pawl of the first column of an adding and subtracting machine when the machine is in total taking position to interject an automatic or fugitive one into the machine in an additive action to counteract or neutralize a fugitive one previously interjected in a subtractive relation.

Third, to provide means for automatically actuating the carry pawl of the first column of an adding and subtracting machine when a positive number introduced into the machine equals or exceeds a negative total previously existing in the machine.

Fourth, to provide linkage alternatively controlled by the subtraction key and the fugitive one actuating mechanism for shifting the accumulator of an adding and subtracting machine to subtract position either when a number is to be subtracted or when a total is taken with a negative amount in the machine.

Fifth, to provide means for automatically actuating the carry pawl of the first or right column of an adding machine in response to movement of the last or left accumulator dial past the numeral nine.

Other objects and advantages of the invention will appear from a consideration of the following description and claims.

The drawings, of which there are nine sheets, illustrate a practical embodiment of the invention. The drawings omit portions of the adding and subtracting machine which are not directly associated with the mechanism for automatically zeroing the dials and printing the clear symbol. For the purpose of clarity parts appearing in some views are omitted in others in which they might appear.

FIG. 1 is a view of the right side of the sector and accumulator actuating mechanism of the machine.

FIG. 2 is a view similar to FIG. 1 but illustrating the mechanism in adding position.

FIG. 3 is a fragmentary perspective view of one of the dials of the machine with the associated adding and subtracting gears and sector in subtracting position.

FIG. 4 illustrates the mechanism of FIG. 3 in adding position.

FIG. 5 is a view of the left side of the right dial, gears, sector and associated carry pawl and carry pawl trip mechanism for interjecting the fugitive one into the right dial.

FIG. 6 is a view of the right side of the machine illustrating the subtract key and the linkage operated thereby.

FIG. 7 is a perspective view of the linkage actuated by the subtract key to control the accumulator in subtracting operations.

FIG. 9 is an enlarged fragmentary view of the left side of the machine with the accumulator control linkage in subtracting position.

Figure 8:
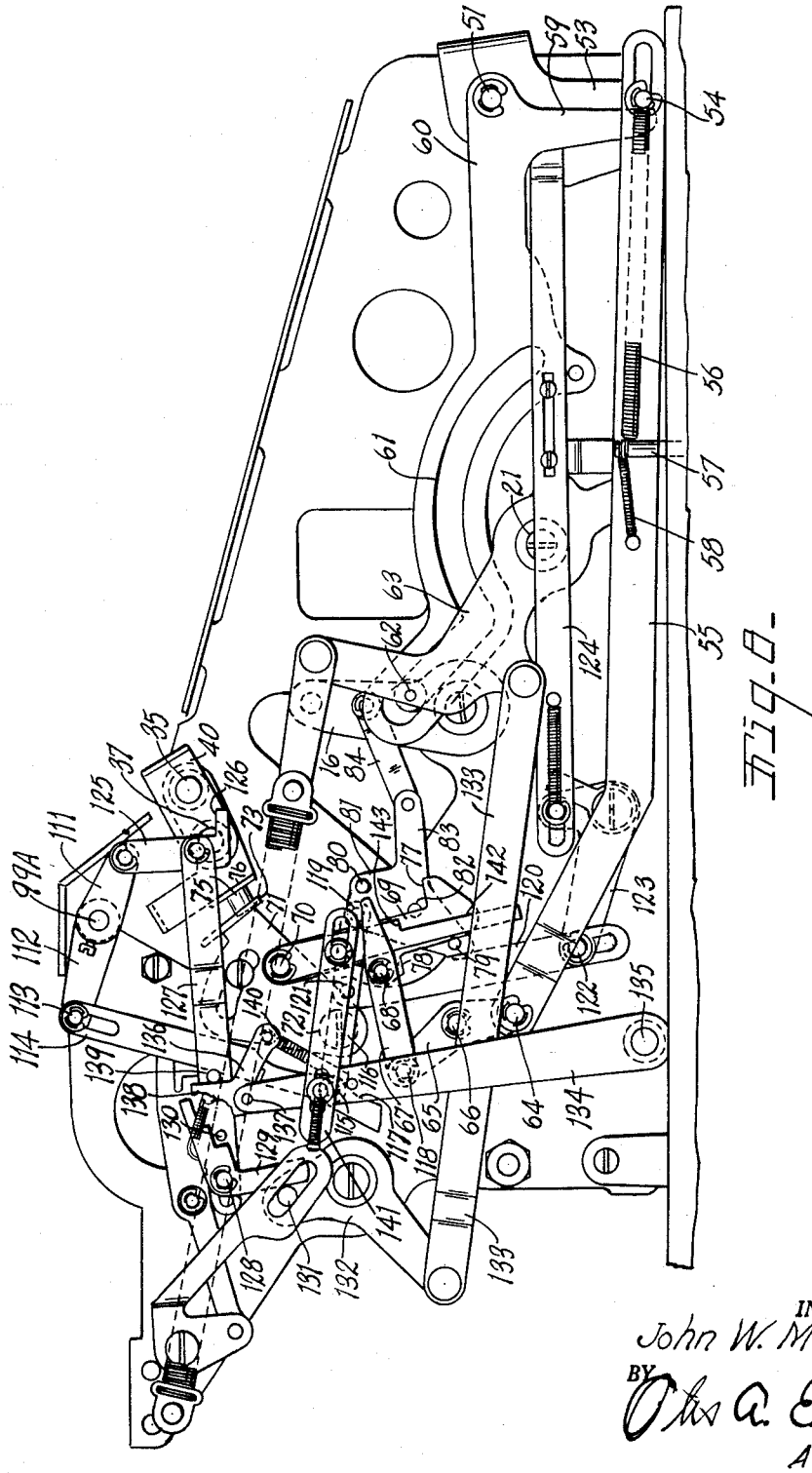
FIG. 8 is a view of the left side of the machine illustrating the linkages for controlling the accumulator for adding and subtracting operations and for controlling the automatic zeroing operation.

The machine includes columns of numeral keys 1 having stems 2 which are depressed into the path of numeral stop arms 3 to limit the movement of the stop arms in response to amounts entered in the machine by depressing the keys. It will be understood that multiple columns of keys and numeral stop arms and associated mechanisms to be described are provided as all adding machines are adapted to handle multi-digit figures. The numeral stop arm 3 is pivoted on a cross shaft 4 and actuated by a link 5 connected to a sector actuator 6 at 7. The sector actuator 6 is rotatably supported on a stationary bearing shaft 8 and is lapped alongside of an adding sector 9. Pins 10 carried by the sector actuator project through short slots 11 in the sector 9 to provide a lost motion driving connection between the sector actuator and the sector. A spring 12 connected between the sector actuator and the sector biases the sector forwardly in a counter-clockwise direction when viewed from the right.

The sector actuator is adapted to be rotated rearwardly or clockwise under conditions to be described by a sector actuator spring 13 which extends rearwardly to a sector actuator spring drive bar 14. The bar 14 is movable along a downwardly and rearwardly or clockwise curved arcuate path, indicated at 15 in FIGS. 2 and 6, upon each actuation of the adding machine by a sector lever 16 (see FIG. 6) pivotally supported at 17. The lever 16 has an arm 18 pivotally connected at 18A to a link 19. The link 19 connects to a plate 20 secured to and rotatable with the main drive shaft 21 of the machine. The shaft 21 is oscillatably driven by a crank arm 22. The crank arm 22 may be manually operated or connected as shown to a connecting rod 23 extending to the crank arm 24 on a shaft 25 driven by the motor 26.

Each numeral stop arm 3 of the machine and its associated sector actuator and sector is capable of being locked against movement by the sector actuator drive springs 13 by a numeral stop release arm 27, one of which is provided for each column of the machine. The release arm 27 is pivotally supported at 28 and has a locking finger 29 movable into blocking engagement with a locking notch 30 on its associated stop arm 3. A rearwardly extending finger 31 on the release arm underlies the stems 2 of the key column to be depressed by any stem that is depressed. This rotates the finger 29 out of locking engagement with the notch 30.

The sector 9 has a gear segment 32 that is selectively engageable with an adding gear 33 and a subtracting gear 34. The gear 33 rotates on a shaft 35 and carries the dial 36. The subtracting gear 34 rotates on a shaft 37. The gears 33 and 34 mesh only along their edges and project laterally from each other as is best illustrated in FIGS. 3 and 4 so that the gear segment 32 can mesh with either gear 33 or gear 34 to the exclusion of the other. The shafts 35 and 37 are longitudinally slidably mounted in accumulator lift arms 38 pivotally supported on each side of the machine on the ends of a cross shaft 39. The shafts 35 and 37 are connected together by a connector plate 40 at the left side of the machine so that both shafts move longitudinally as a unit. The shafts 35 and 37 and gears 33 and 34 are collectively referred to as the accumulator.

In operation, to add amounts into the accumulator the accumulator is lifted by the lift arms 38 during the first forward or counterclockwise motion of the crank arm 22 as viewed in FIG. 6 and prior to rearward clockwise rotation of the sector 32. The means for lifting the accumulator lift arms 38 is not illustrated as it is an old and necessary expedient in adding and subtracting machines to shift the accumulator gears and dials out of engagement with their coacting gear segment as the gear segments are set during listing operations, either add or subtract, and after the accumulator dials and gears have actuated or set the gear segments on total taking and printing operations. Such an accumulator raising and lowering means is known and used, for example in the R. C. Allen, Model 9, 9 bank adding and subtracting machine. The accumulator remains located to the right and on forward counterclockwise movement of the sector the accumulator falls to engage the add gear 33 with gear segment 32 as in FIG. 4 and rotation of the segment moves the gear to increase the number indicated on the dial 36. During or prior to subtracting operations the accumulator moves to the left so that the gear segment 32 meshes with the subtract gear 34 as in FIG. 3 and the dial is reversely rotated to decrease the number or total indicated thereon.

Subtracting operations are effected by pressing down the subtract key 41 (see FIG. 6). The stem 42 of the subtract key actuates a link 43 for tripping the switch mechanism generally indicated at 44 and starts the motor 26. The stem 42 also acts through the link 45 to depress the crank arm 46. The crank arm 46 is on a short rock shaft 47 (see FIG. 7) that carries a locking pawl 48. The pawl 48 normally engages a slide bar 49. The slide bar 49 connects to the crank arm 50 on a transversely extending rock shaft 51 and controls oscillation of a yoke 52 secured to the left end of the rock shaft. The yoke 52 has a depending arm 53 which carries a pin 54 on the left side of the machine. The pin 54 rides in a slot in a rearwardly extending link 55 and is urged rearwardly by a spring 56. The spring 56 is anchored on a fixed pin 57 and when the yoke 52 and pin 54 are restrained against rearward movement the slide bar 55 is urged forwardly against the pin 54 by a light spring 58 also anchored on the pin 57.

Rearward motion of the pin 54 is further controlled or timed to the cycle of the machine by a lever 59 pivoted on the end of the rock shaft 51 and bearing against the rear of the pin 54. The lever 59 has a rearwardly extending cam plate 60 formed thereon and the plate 60 defines a curved cam slot 61. A pin 62 carried on the crank arm 63 attached to the left end of the main drive shaft 21 travels in the cam slot 61 and controls the movement of the lever 59.

The link 55 along the left side of the machine controls the shift of the accumulator between add and subtract positions. The rear end of link 55 connects at 64 to one side of a bell crank 65. The bell crank is fixedly pivoted at 66 and pivoted on its upper end is a forwardly projecting finger 67. The finger 67 is pivotally connected at 68 to a link 69 which is suspended from the pivot pin 70 on an accumulator shift plate 71. The link 69 constitutes shift control means to determine shifting of the accumulator between add and subtract positions as will be explained. The plate 71 is fixedly pivoted at 72 and has a laterally projecting flange 73 on its upper side. The flange 73 has a transversely angled cam slot 74 therein. The slot receives and drives a pin 75 projecting rearwardly and downwardly from a flange 76 on the previously described connector plate 40 which secures the accumulator shafts 35 and 37 together. Forward or downward clockwise motion of the accumulator shift plate 71 as viewed in FIGS. 8 and 9 moves the pin 75 and the accumulator to the left into subtract position. Reverse motion moves the accumulator to add position.

The link 69 which is controlled by the previously described links 67, 65, and 55, is provided with an upwardly facing shoulder 77 on its front edge and a downwardly facing shoulder 78 on its rear edge just below the pin 68. The shoulders 77 and 78 are arranged to be engaged alternatively or selectively by pins 79 and 80 carried on a bell cank 81. The bell crank and the pins constitute add and subtract drive elements. The bell crank 81 is fixedly pivoted at 82 and has an arm 83 connected by the link 84 to the sector lever 16 on the left side of the machine. Each rearward (clockwise as viewed in FIG. 6 and counterclockwise in FIG. 8) motion of the sector lever rotates bell crank 81 clockwise in FIGS. 8 and 9 and moves the pin 80 downwardly and the pin 79 upwardly. If the link 69 is moved forwardly by the finger 67, the pin 80 engages the shoulder 77 to draw the link 69 and the accumulator drive plate 71 downwardly into subtract position. When the link 69 is in its rearward position the pin 79 engages the shoulder 78 to raise the link and the accumulator drive plate to add position.

*Negative total or credit balance indicating mechanism*

Figures 11, 12:
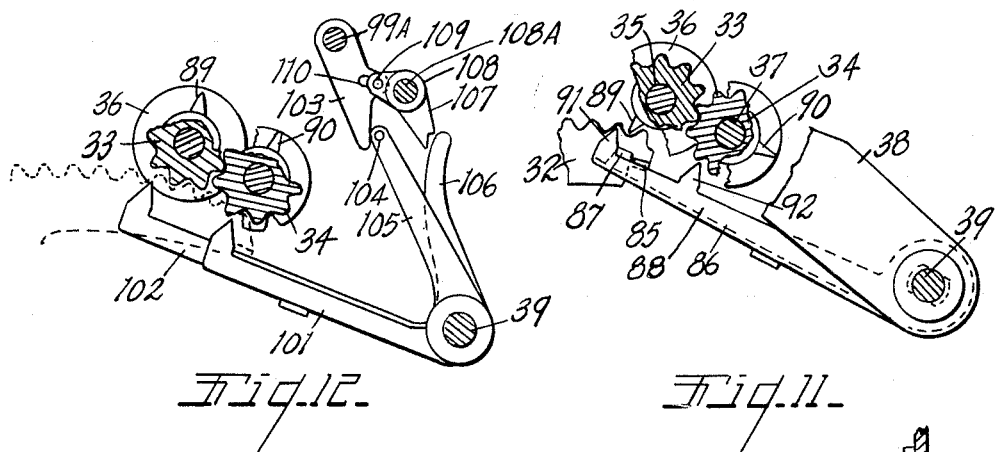
FIG. 11 is a fragmentary side elevational view of the adding and subtracting gears and carry pawl of an interior column and sector of the machine.
FIG. 12 is a fragmentary side elevational view of the add and subtract gears and carry pawls of the left column and sector of the machine, the view being taken along the plane of the line 12—12 in FIG. 10.
Figure 10:
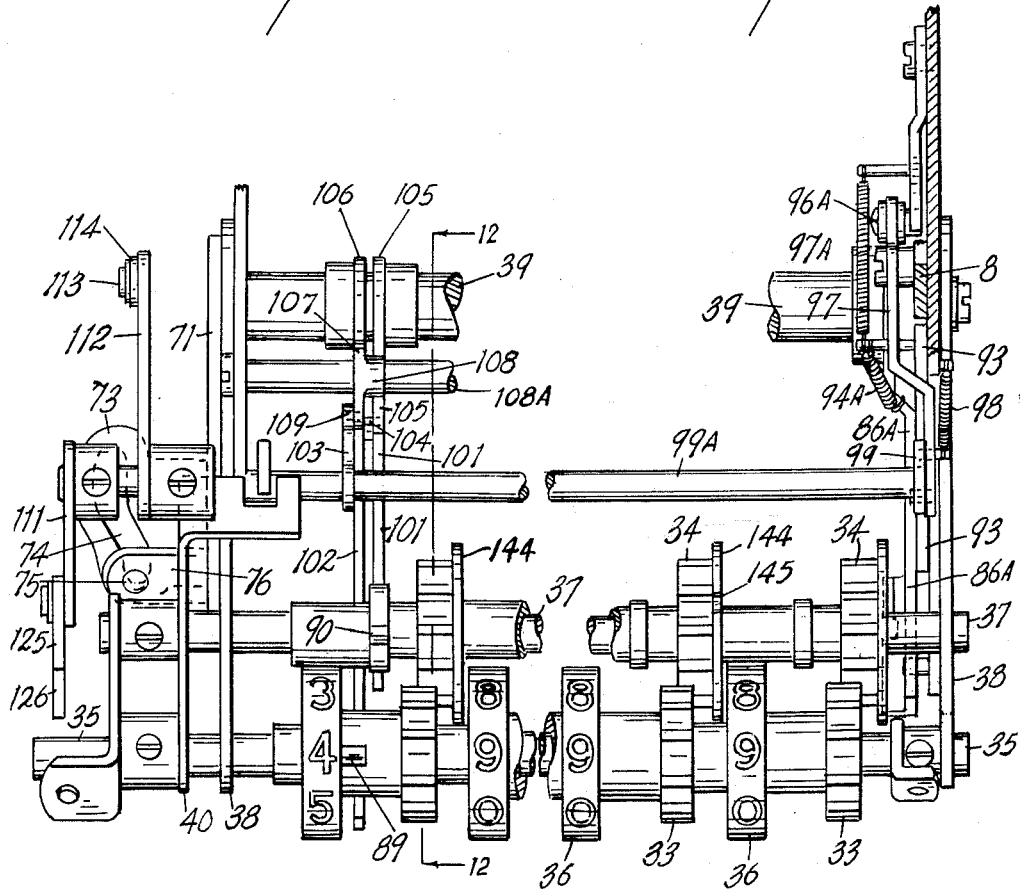
FIG. 10 is a fragmentary plan view showing the ends of the dial section and the accumulator shifting mechanism.

The gear segment 32 of each sector has a laterally and radially projecting ear 85. The cross shaft 39 acts as a pivotal support for a plurality of carry pawls 86 (see FIG. 11), there being one carry pawl for each gear sector and column in the machine. The pawls project forwardly under the at rest, retracted, positions of the gear segments and have upstanding lugs 87 which engage and normally hold the ear 85 on the associated gear segment and sector in slightly rearwardly or clockwise rotated position as viewed in FIGS. 1 and 2 with respect to its sector actuator 6 at the end of the forward counterclockwise rotation of the sector actuator. Thus if the carry pawl of any sector is depressed to release the gear segment from the lug 87, the gear segment and actuator is free to rotate forwardly or counterclockwise an extra increment predetermined by the length of the slots 11 in the sector and the movement of the pins 10 therein. This increment of movement is predetermined to cause rotation of either the adding or the subtracting gear associated with the gear segment by a distance equal to one number on the associated dial 36.

The numerical carry operation or advance of the dial of one column when the dial of the next column to the right passes the numeral 9 is accomplished by providing an upstanding flange 88 (see FIG. 11) on each of the interior pawls 86. An ear 89 on one side of the dial 36 and an ear 90 on the opposed side of the corresponding subtract gear 34 are positioned to alternatively register with an add tooth 91 and a subtract tooth 92 respectively on the carry pawl as the accumulator shifts between add and subtract position. When adding over the amount nine the ear 89 trips the tooth 91 on the pawl 86 of the next column to the left and carries an extra digit into that column since release of the ear 85 lets the segment rotate forwardly a distance determined by the length of the slot 11 as previously described. When subtracting more than nine the ear 90 acts correspondingly on the tooth 92.

The extreme right sector and carry pawl 86A have no adjacent pair of add and subtract gears to actuate them for carry operations. Instead, the right carry pawl 86A (see FIG. 5) is lapped alongside of an actuating plate 93 pivoted on the right end of the shaft 39. The pawl 86A has a lug 93A that underlies the edge of the plate 93 so that downward clockwise movement of the plate as viewed in FIG. 5 depresses the carry pawl 86A. A strong spring 94 biases the plate 93 clockwise downwardly while a relatively light spring 94A returns the carry pawl counterclockwise upwardly when the actuating plate is elevated as will be described. The rear or left side of the actuating plate 93 has a keeper lug 95 thereon that is engaged and held in retracted position by a notch 95A in the trigger lever 96. FIG. 5 illustrates the trigger lever and the carry pawl 86A in tripped or advanced position. The swinging end of the trigger lever 96 is pivoted at 96A to a lever 97 fixedly pivoted at 97A. The other end of the lever 97 is biased to counterclockwise raised position by a spring 98 and carries a pin 98A positioned to be depressed by a cam 99. The cam 99 is angularly swingably mounted on a cross control shaft 99A that extends transversely across the upper part of the machine. As the shaft 99A is rocked in either direction as will be described, the cam 99 depresses the pin 98A to trip the trigger and depress the carry pawl 86A. The actuating plate 93 is raised counterclockwise in FIG. 5 or restored by engagement of a pin 100 on the accumulator lift arm 38 with an ear 100A on the actuating plate when the accumulator is lifted at the start of each operation of the machine. The actuating plate 93 and carry pawl are thus always ready to release the sector 9 of the right column whenever the cam 99 is actuated in either direction. Release of the sector of the first column automatically puts an extra number into the first column. The extra number is referred to as an automatic or fugitive one. Depending on whether the machine is in add or subtract position this fugitive one is added to or subtracted from the total shown on the dials.

When adding and subtracting a series of figures the automatic or fugitive one features of the machine remain inoperative so long as the amount added is greater than the amount subtracted. However, when the amount subtracted is greater than the amount added all dials to the left of the right dial are returned to zero or beyond and the right dial moves past zero in a negative or subtracting direction. The subtracting carry pawl ear 90 on the subtracting gear of each active column trips the carry pawl 86 of the next column to the left. Since the subtract gear and dial of the inactive columns to the left are by hypothesis at zero they are automatically retracted one number to the nine position. The operation progresses automatically to the left across the machine as each subtracting gear moves from zero to nine position and trips the carry pawl of the next column to the left.

The extreme left column of the machine has associated therewith a subtract carry pawl 101 (see FIG. 12) pivoted on the shaft 39. Positioned alongside the pawl 101 is an add carry pawl 102. The transversely extending shaft 99A has a depending arm 103 positioned in the path of a pin 104 carried by the upstanding arm 105 on the subtract carry pawl 101 so that when the ear 90 on the extreme left subtract gear trips the subtract carry pawl the pin 104 moves the arm 103 forwardly or clockwise in FIG. 12. This moves the shaft 99A and the cam 99 at the right side of the machine to trip the trigger lever 97 and the first carry pawl 86A and introduce a negative fugitive one into the accumulator.

The add carry pawl 102 at the left of the machine has an upstanding arm 106 positioned to trip the arm 107 of a crank 108. The crank 108 pivots freely on shaft 108A. The crank 108 carries a pin 109 engaged in a slot 110 in the arm 103 so that tripping the add carry pawl at the left of the machine moves the arm 103 and cam 99 rearwardly or counterclockwise in FIG. 5 to again trip the trigger lever and introduce a positive fugitive one into the machine. Thus when the accumulator has a negative total, for example minus three, therein the left inactive dials will show the numeral nine and the right active dial will show the complement seven of the negative total less one or six. When an amount, for example four, sufficient to erase the negative balance plus one or more is added into the machine the active right hand column and adding gear 33 will advance past nine to zero and in so doing will trip the carry pawls 86 of the inactive columns. The inactive columns all being at 9 will carry the pawl tripping action across the machine to the add carry pawl 102. Functioning as described above, the add carry pawl will actuate the shaft 99A and cam 99 to add in a fugitive one to the first column dial so that all dials return automatically to the true positive value of one.

Linkage on the left side of the machine as disclosed in FIGS. 8 and 9 also functions to automatically determine the positive or negative total in the machine after the introduction of a number of positive and negative amounts and to shift the accumulator accordingly for totalling operations. The left end of the cross shaft 99A has a forwardly extending arm 111 and a rearwardly extending arm 112 secured thereto. A pin 113 on the arm 112 rides in a slot in the upper end of a depending link 114 and supports the link when the arm 112 is raised. The lower end of the link 114 is pivotally connected at 115 to a drag link 116 having a forwardly facing hook 117 at its rear end that is adapted to engage the pin 118 and crank 65 when the shaft 99A and arm 112 are rotated rearwardly or counterclockwise in FIG. 9 as they are after a negative total has been established and the cam 99 moved forwardly or clockwise in FIG. 5 to introduce the negative fugitive one. The drag link 116 which may be termed a disengageable link is pivoted at 119 to the crank 81. Thus when the link 114 is lowered by the arm 112, the hook 117 will engage the pin 118 and when the crank 81 is rotated by actuation of the sector actuator lever 16, the link 67 will be pushed forwardly to position the link 69 and its hook 77 under the descending pin 80. This shifts the accumulator shift plate 71 to subtract position just as when a negative amount is introduced into the machine.

The depending link 114 and the drag link 116 are further under the control of an upright link 120 connected at 121 to the mid portion of the link 116. The lower end of the link 120 is slotted and supported on a pin 122 carried by the crank 123. The crank 123 is in turn controlled by the link 124. The link 124 is permitted to move rearwardly by mechanism not illustrated whenever a total is taken. This lets link 120 fall and if arm 112 is down as it will be if a negative total is in the accumulator as previously explained the link 114 and drag link 116 will be lowered to pull crank 65 forward and shift the accumulator shift plate 71 to subtract position.

The forwardly projecting arm 111 on shaft 99A carries a depending link 125 having an upwardly facing hook 126 on its forward end. The hook 126 is adapted to engage under the end of the forward accumulator shaft 35 when the shaft 35 is raised by the arms 38 and when the hook is pushed forward. The hooked link is controlled by a link 127 that is slidably supported at its rear end by a fixed pin 128. A crank 129 also pivoted on the pin 128 has a forwardly extending arm adapted to fall behind the pin 130 on the link 127 to prevent rearward motion of the link 127. The crank 129 is cammed upwardly or counterclockwise in FIGS. 8 and 9 out of blocking relation to the link 127 by a pin 131 on the crank 132. The crank 132 is rotated forwardly or clockwise in FIG. 8 by rearward motion of the link 133 and crank 63 on the rearward counterclockwise motion of the crank 63 at the end of any entry or totaling cycle of the machine.

The link 127 is controlled by the lever 134 secured to the end of a cross shaft 135 at the bottom of the machine. The shaft 135 is connected on the right side of the machine to the automatic total key (not illustrated) and when the total key is actuated the shaft 135 and lever 134 rotate forwardly or clockwise in FIG. 8. A crank 136 pivoted at 137 on the top of the lever 134 has an arm 138 that is moved forward against a pin 139 on the link 127. A spring 140 applies a forward biasing force to the pin 139 and link 127 so that when the accumulator moves up after printing the total in the machine, the link 127 will move the hook 126 forwardly under the shaft 35.

The crank 129 falls behind the pin 130 to hold the hook 126 forward. Assuming the situation of taking a negative total, the idle dials are already at nine and the active dials all return to nine in actuating the printing mechanism of the machine after which the accumulator rises to permit return of the gear sectors to zero position after which the accumulator drops down at the end of the return stroke of the main crank shaft 21, the shaft 35 will pull down on the hook 126 and cause the arm 111 and shaft 99A to rotate forwardly, or clockwise in FIG. 9. As previously described forward rotation of the shaft 99A (counterclockwise in FIG. 5) moves the cam 99 rearwardly to trip the carry pawl 86A of the first column of the machine. This returns the first column dial to zero and successively trips the several carry pawls across the machine to return all dials to zero so the machine is cleared and all the dials read zero. When the accumulator has a positive total therein and a total is taken, the shaft 99A and arm 111 are in rearwardly counterclockwise in FIGS. 8 and 9 or upwardly rotated position so that the link 125 supports the nose of the hook 126 opposite the back side of the shaft 35. In this condition of the machine the forward rotation of the lever 134 cannot move the link 127 and hook 126 forwardly and no fugitive one is added into the machine as the accumulator drops down after a total taking operation.

At the end of the return stroke on a negative total taking operation, the lever 134 is rotated forwardly and in turn moves link 142 forwardly. Link 142 overlies the link 69 and is connected therewith to the cam plate 71. A downwardly facing shoulder 143 on the link 142 engages the pin 80 in the forwardly displaced position of the link 142 and on the return stroke of the pin 80 and crank 81 the link 143 and the cam plate 71 are pushed upwardly to restore the pin 75 and the accumulator to the right add position at the end of a negative total taking operation.

Having thus described the invention, what is claimed to be new and what is desired to be secured by Letters Patent is:

1. In an adding and subtracting machine having a transversely and vertically shiftable accumulator with dials and carry pawls for the dials thereof, a plate (71) pivoted on the side of said machine and having a laterally turned flange (73) with an angled cam slot therein, a pin (75) on said accumulator engaged in said slot to move said accumulator laterally between add and subtract positions upon movement of said plate, a rock shaft (99A) extending transversely of said machine and connected to trip the carry pawl of the right dial of the machine upon rearward and also upon forward rocking of the shaft, means (38) for raising and lowering said accumulator (33—37) at the end of a total taking operation, oppositely extending arms (111, 112) on the end of said shaft, links (114, 125) depending from the ends of said arms, a lever (134) on said machine actuated upon conditioning the machine for total taking operations, a push bar (127) yieldably positioned in the path of said lever and tiltably supported by said link (125) to advance said link (125) under a vertically movable portion (35) of said accumulator when said one link (125) is raised and said accumulator is raised whereby descending motion of the accumulator moves said shaft to trip the carry pawl of the right dial, a crank (81) on said machine oscillated on each actuation of the machine and having projections (79, 80) on opposite sides of its pivot, a first shift link (69) pivoted on said plate and having oppositely facing shoulders (77, 78) swingable alternatively into the path of the projections on said crank, means actuated upon subtracting operations (55, 65, 118, 67) connected to said first shift link (69) to move the same into engagement with said crank whereby movement of the crank moves said plate and accumulator to subtract position, a pull bar (116) connected between said crank and the lower end of the other link (114) depending from the other arm on said shaft, said pull bar carrying a hook (117) engageable with said last means (118) when said other arm is lowered whereby actuation of said crank moves said last means to move said first shift link (69) out of registry with the projection (79) on said crank that would move said shift plate and accumulator to add position, a lift bar (120) connected to said pull bar (116), means (123) connected to said lift bar to permit lowering said lift bar by said other link (114) during total taking operation of the machine, a second shift link (142) connected to said plate and having a downwardly facing shoulder (143), and a link (141) connected between said lever (134) and said second shift link (142) to move said second shift link into registry with a projection (80) on said crank to raise said plate (71) and shift said accumulator to add position at the end of a total taking operation.

2. In an adding and subtracting machine having a transversely and vertically shiftable accumulator with dials and carry pawls for the dials thereof, a plate pivoted on the side of said machine and having a laterally turned flange with an angled cam slot therein, a pin on said accumulator engaged in said slot to move said accumulator laterally between add and subtract positions upon movement of said plate, a rock shaft extending transversely of said machine and connected to trip the carry pawl of the right dial of the machine upon rearward and also upon forward rocking of the shaft, means for raising and lowering said accumulator at the end of a total taking operation, an arm on the end of said shaft, a link depending from the end of said arm, a lever on said machine actuated upon total taking operations of said machine, a bar positioned in the path of said lever and tiltably supported by said link to advance said link under a vertically movable portion of said accumulator when said one link is raised and said accumulator is raised whereby descending motion of the accumulator moves said shaft to trip the carry pawl of the right dial.

3. In an adding and subtracting machine having a transversely and vertically shiftable accumulator with dials and carry pawls for the dials thereof, a plate pivoted on the side of said machine and having a laterally turned flange with an angled cam slot therein, a pin on said accumulator engaged in said slot to move said accumulator laterally between add and subtract positions upon movement of said plate, a rockshaft extending transversely of said machine and connected to trip the carry pawl of the right dial of the machine upon rearward and also upon forward rocking of the shaft, a trip pawl connected to said shaft and positoned to be actuated by the left dial of the machine in moving from zero to nine, means for raising and lowering said accumulator at the end of a total taking operation, an arm on the end of said shaft, a link depending from the end of said arm, a lever on said machine actuated upon total taking operations of said machine, a bar connected between said lever and said link to advance the link under a vertically movable portion of said accumulator when said link is raised and said accumulator is raised whereby descending motion of the accumulator moves said shaft to trip the carry pawl of the right dial.

4. In an adding machine having a movable accumulator with a plurality of pairs of adding and subtracting gears and sectors cooperative with each pair, mechanism for introducing a fugitive one into said accumulator comprising, carry pawls cooperative with the sectors of all but the lowest order pair of adding and subtracting gears and having ears positioned to be depressed by lugs on the adjacent lowest order pair of adding and subtracting gears, a right carry pawl lockingly engageable with the sector of the lowest order pair of gears, a trip member mounted adjacent said accumulator in engagement with said right carry pawl and rockingly rotatably reciprocal to trip said right carry pawl, a spring biasing said trip member to pawl tripping position, a trigger releasably connected with said trip member to hold the same in untripped position, linkage connected to release said trigger, a cam swingingly mounted on said accumulator to actuate said linkage on forward and also upon backward motions of the cam, a shaft connected to said cam and extending across said accumulator, carry pawls positioned to be actuated by the lugs on the highest order pair of adding and subtracting gears and connected to rock said rock shaft, an operating arm on the left end of said shaft, and other linkage on the left side of said machine operatively connected to said arm to rock said shaft and cam upon total taking actuation of said machine, said other linkage having a disconnectable portion that is disconnected when the total taken is a positive total, said trip member having a porton disposed in the path of said accumulator whereby movement of the accumulator restores the trip member and trigger to starting position.

5. In an adding machine having an accumulator with a plurality of pairs of adding and subtracting gears and sectors cooperative with each pair, mechanism for introducing a fugitive one into said accumulator comprising, carry pawls cooperative with said sectors of all but the lowest order pair of adding and subtracting gears and having ears positoned to be depressed by lugs on the adjacent lowest order pair of adding and subtracting gears, a right carry pawl lockingly engageable with the sector of the lowest order pair of gears, a trip member mounted adjacent said accumulator and movable to trip said right carry pawl, a spring biasing said trip member to pawl tripping position, a trigger releasably connected with said trip member to hold the same in untripped position, release means connected to said trigger, a cam swingingly mounted on said accumulator to actuate said release means on forward and also upon backward motions of the cam, a shaft connected to said cam and extending across said accumulator, an operating arm on the left end of said shaft, and linkage on the left side of said machine operatively connected to said arm to rock said shaft and cam upon total taking actuation of said machine, said linkage having a disconnectable portion that is disconnected when the total taken is a positive total.

6. In an adding machine having an accumulator with a plurality of pairs of adding and subtracting gears and sectors cooperative with each pair, mechanism for introducing a fugitive one into said accumulator comprising, carry pawls cooperative with said sectors of all but the lowest order pair of adding and subtracting gears and having ears positioned to be depressed by lugs on the adjacent lowest order pair of adding and subtracting gears, a right carry pawl lockingly engageable with the sector of the lowest order pair of gears, a cam swingingly mounted on said accumulator, mechanism actuated by said cam to trip said right carry pawl on forward and also upon backward motions of the cam, a shaft connected to said cam and extending across said accumulator, carry pawls positioned to be actuated by lugs on the highest order pair of gears and connected to reversely rock said rock shaft, an operating arm on the left end of said shaft, and linkage on the left side of said machine operatively connected to said arm to rock said shaft and cam upon total taking actuation of said machine, said linkage having a disconnectable portion that is disconnected when the total taken is a positive total.

7. In an adding machine having an accumulator with a plurality of pairs of adding and subtracting gears and sectors cooperative with each pair, mechanism for introducing a fugitive one into said accumulator comprising, carry pawls cooperative with said sectors of all but the lowest order pair of adding and subtracting gears and having ears positioned to be depressed by lugs on the adjacent lowest order pair of adding and subtracting gears, a right carry pawl lockingly engageable with the sector of the lowest order pair of gears, a cam swingingly mounted on said accumulator, mechanism actuated by said cam to trip said right carry pawl on forward and also upon backward motions of the cam, a shaft connected to said cam and extending across said accumulator, an operating arm on said shaft, and linkage on said machine operatively connected to said arm to rock said shaft and cam upon total taking actuation of said machine, said linkage having a disconnectable portion that is disconnected when the total taken is a positive total.

8. In combination with an accounting machine having a plurality of sectors and an accumulator shiftable laterally between add and subtract positions and vertically between sector engaged and sector disengaged positions, said accumulator having a plurality of pairs of adding gears and subtracting gears alternatively engaged with said sectors when said accumulator is in add and subtract positions respectively, fugitive one introducing means for introducing a fugitive one into said accumulator, shift means for laterally shifting said accumulator between add and subtract positions, means for shifting said accumulator to sector disengaged position and back to sector engaged position after total taking operation of the machine, means responsive to establishment of a negative total in said accumulator for actuating said introducing means while said accumulator is in subtract position, means responsive to reestablishment of a positive total in said accumulator for actuating said introducing means while said accumulator is in add position, means responsive to conditioning the machine for total taking operation and operative in one position of said introducing means for actuating said shift means to shift said accumulator to subtract position when there is a negative total in said machine, means operative at the end of total taking opeartion of the machine and in said one position of said introducing means to return said accumulator to add position, and means conditioned in response to the location of said introducing means in said one position and operative in response to total taking operation to engage said introducing means with said accumulator in sector disengaged position whereby return of said accumulator to sector engaged position at the end of a negative total taking operation actuates said introducing means to introduce a fugitive one into the accumulator in a positive relation.

9. In combination with an accounting machine having a plurality of sectors and an accumulator shiftable laterally between add and subtract positions and vertically between sector engaged and sector disengaged positions, said accumulator having a plurality of pairs of adding gears and subtracting gears alternatively engaged with said sectors when said accumulator is in add and subtract positions respectively, fugitive one introducing means for introducing a fugitive one into said accumulator, shift means for laterally shifting said accumulator between add and subtract positions, means for shifting said accumulator to sector disengaged position and back to sector engaged position after total taking operation of the machine, means responsive to establishment of a negative total in said accumulator for actuating said introducing means while said accumulator is in subtract position, means responsive to reestablishment of a positive total in said accumulator for actuating said introducing means while said accumulator is in add position, and means conditioned in response to the location of said introducing means in one position and operative in response to total taking operation to engage said introducing means with said accumulator in sector disengaged position whereby return of said accumulator to sector engaged position at the end of a negative total taking operation actuates said introducing means to introduce a fugitive one into the accumulator in a positive relation.

10. In combination with an adding machine adapted to register negative totals and having an accumulator with visible dials, carry pawls adapted to be tripped by lugs on all but the highest order dial and each connected to advance the next higher order dial by one digit, a right carry pawl adapted to advance the lowest order dial of the machine, a shaft having means on its left end positioned to be actuated by a lug on the highest order dial, means on the right end of said shaft positioned to trip said right carry pawl in response to shaft actuating movement of the highest order dial, an arm on the left end of said shaft, a hook depending from said arm, means for raising and lowering said accumulator at the end of a total taking operation, a projection on said accumulator, a link connected to said hook, and means biasing said link to move said hook under the raised position of said projection when a negative total is taken on the machine whereby lowering of the accumulator moves said hook and shaft to trip the right carry pawl and zero the dials on the machine.

11. In an adding machine having a laterally and vertically shiftable acumulator with a plurality of pairs of sector driven adding and subtracting gears and sectors arranged to actuate each pair of gears, mechanism for introducing a fugitive one into said accumulator comprising, carry pawls cooperative with the sectors of all but the lowest order pair of adding and subtracting gears and having ears positioned to be depressed by lugs on the adjacent lowest order pair of adding and subtracting gears, a right carry pawl lockingly engageable with the sector of the lowest order pair of gears, a trip member mounted adjacent said accumulator and movable to trip said right carry pawl, a trigger releasably engaged with said trip member, a cam swingingly mounted on said accumulator to actuate said trigger on forward and backward motions of the cam, a shaft connected to said cam and extending across said accumulator, an operating arm on the left end of said shaft, a left carry pawl positioned to be actuated by the lug on the left subtracting gear to rock said arm and shaft and cam to trip said trigger and right carry pawl, linkage on the left side of said machine operatively connected to a second cam connected to shift said accumulator longitudinally upon total taking actuaton of said machine, said linkage having a disconnectable portion that is disconnected when the sign of the total taken corresponds to the sign of the previous amount entered in the machine, a crank operatively engaged with said operating arm on the left end of said shaft, and a second left carry pawl pivoted on said machine and having lever arms operatively engageable between the lug on the left adding gear and said crank to rock said shaft and trip said right carry pawl when a positive number introduced exceeds in an absolute sense an existing negative total in the accumulator.

12. In an adding and subtracting machine having a transversely and vertically shiftable accumulator with dials and pairs of add and subtract gears and a sector for actuating each pair of gears and carry pawls cooperative with each of said sectors except the sector of the lowest order pair of gears, and a right carry pawl cooperative with the sector associated wtih said lowest order pair of gears, a plate pivoted on said machine and having an angled cam slot therein, a pin on said accumulator engaged in said slot to move said accumulator laterally between add and subtract positions upon movement of said plate, a rock shaft extending transversely of said machine and connected to trip the right carry pawl of the lowest order pair of gears of the machine upon rearward and forward rocking of the shaft, means operatively associated with the highest order pair of gears of the machine and connected to oppositely rock said rock shaft, means for raising and lowering said accumulator at the end of a total taking operation, opopsitely extending arms on said shaft, first and second links depending from said arms, a lever on said machine actuated upon conditioning the machine for total taking operations, a push bar yieldably connected between said lever and said first of said links to advance the link under a vertically movable portion of said accumulator when said first link and said accumulator are raised whereby descending motion of the accumulator moves said shaft to trip said right carry pawl, a crank on said machine oscillated on each actuation of the machine and having projections on opposite sides of its pivot, a third shift link pivoted on said plate and having oppositely facing shoulders swingable alternatively into the path of the projections on said crank, means actuated upon subtracting operations and connected to said third shift link to move the same into engagement with said crank to move said plate and accumulator to subtract position, a pull bar connected between said crank and the lower end of the second link depending from the other arm on said shaft, said second link and said pull bar carrying a hook engageable with said last means when said second arm is lowered to move siad third shift link out of registry with the projection on said crank that would move said shift plate and accumulator to add position, a lift bar connected to said pull bar, and adapted to hold said pull bar and said hookup out of engagement with said last means, means connected to said lift bar to permit lowering of said lift bar during total taking operation of the machine when said second link is lowered and permit engagement of said hook with said last means, a fourth shift link connected to said plate and having a downwardly facing shoulder, and a link connected between said lever and said fourth shift link and actuated by said lever to move said fourth shift link into registry with a projection on said crank to raise said plate and shift said accumulator to add position at the end of a negative total taking operation.

13. In an adding and subtracting machine having a transversely and vertically shiftable accumulator with pairs of intermeshed add and subtract gears with a visible dial on each pair and actuating sectors and carry pawls for the sectors associated with each pair of gears, an accumulator shift member (71) provided on said machine and engaged with said accumulator to move said accumulator laterally between add and subtract positions, a rock shaft (99A) extending transversely of said machine and connected to trip the carry pawl of the sector of the lowest order pair of gears of the machine upon rearward and also upon forward rocking of the shaft, carry pawls (101, 102) operatively associated with the highest order pair of gears on said machine and being connected to oppositely rock said rock shaft, means (38) for raising and lowering said accumulator at the end of a total taking operation, oppositely extending arms (111, 112) on said shaft, links (114, 125) depending from the ends of said arms, a lever (134) on said machine actuated upon conditioning said machine for total taking operations, a bar (127) yieldably connected between said lever and one of said links to advance the link under a vertically movable portion (35) of said accumulator when said one link (125) and said accumulator are raised whereby descending motion of the accumulator moves said shaft to trip the carry pawl of the lowest order sector, add and subtract drive elements (79, 80) oppositely advanced and retracted on each actuation of said machine, shift control means (69, 142) engaged with said accumulator shift member and selectively engageable with said add and subtract drive elements, means (65, 67) actuated in response to conditioning of said machine for subtracting operation to move said shift control means into engagement with said subtract drive element, means (141) actuated in response to conditioning said machine for total taking operation to move said shift control means into engagement with said subtract drive element (80) on the returning motion thereof to move said accumulator to add position at the end of the total taking operation, a disengageable link (116) actuated with said drive elements and connectable (117, 118, 67) with said shift control means (69) to move said shift control means into engagement with said subtract drive element, a first disconnect means (114) comprising the other of said links connected to said rock shaft and operative in the unactuated positive total position of said rock shaft to disconnect said disengageable link from said shift control means, and a second disconnect means (120) normally disconnecting said disengageable link from said shift control means and actuated upon conditioning said machine for adding operation to permit said disengageable link to engage said shift control means when said first disconnect means also permits said engagement.

14. In an adding and subtracting machine having a transversely and vertically shiftable accumulator with pairs of intermeshed add and subtract gears with a visible dial on each pair and actuating sectors and carry pawls for the sectors associated with each pair of gears, an accumulator shift member movably mounted on said machine and engaged with said accumulator to move said accumulator laterally between add and subtract positions, a rock shaft extending transversely of said machine and connected to trip the carry pawl of the sector of the lowest order pair of gears of the machine upon advancing and retracting rocking of the shaft, carry pawls operatively associated with the highest order pair of gears on said machine and being connected to oppositely rock said rock shaft, means for raising and lowering said accumulator at the end of a total taking operation, crank arms on said shaft, links depending from the ends of said arms, a lever on said machine actuated upon conditioning said machine for total taking operations, a bar yieldably connected between said lever and one of said links to advance the link into the path of a vertically movable portion of said accumulator when said one link and shaft are in advanced negative total position whereby motion of the accumulator retracts said shaft to trip the carry pawl of the lowest order sector, add and subtract drive elements oppositely advanced and retracted on each actuation of said machine, shift control means engaged with said accumulator shift member and selectively engageable with said add and subtract drive elements, means actuated in response to conditioning of said machine for subtracting operation to move said shift control means into engagement with said subtract drive element to move said accumulator to subtract position, means actuated in response to conditioning said machine for total taking operation to move said shift control means into engagement with said subtract drive element on the returning motion thereof to move said accumulator to add position at the end of the total taking operation, a disengageable link actuated with said drive elements and connectable with said shift control means to move said shift control means into engagement with said subtract drive element, and disconnect means actuated by the other of said links connected to said rock shaft and operative in the retracted positive total position of said rock shaft to disconnect said disengageable link from said shift control means.

15. In an adding and subtracting machine having a transversely and vertically shiftable accumulator with pairs of intermeshed add and subtract gears with a visible dial on each pair and actuating sectors and carry pawls for the sectors associated with each pair of gears, an accumulator shift member movably mounted on said machine and engaged with said accumulator to move said accumulator laterally between add and subtract positions, a rock shaft extending transversely of said machine and connected to trip the carry pawl of the sector of the lowest order pair of gears of the machine upon advancing and retracting rocking of the shaft, carry pawls operatively associated with the highest order pair of gears on said machine and being connected to oppositely rock said rock shaft, means for raising and lowering said accumulator at the end of a total taking operation, crank arms on said shaft, links depending from the ends of said arms, a lever on said machine actuated upon conditioning said machine for total taking operations, a bar yieldably connected between said lever and one of said links to advance the link into the path of a vertically movable portion of said accumulator when said one link and shaft are in advanced negative total position whereby motion of the accumulator retracts said shaft to trip the carry pawl of the lowest order sector, add and subtract drive elements oppositely advanced and retracted on each actuation of said machine, shift control means engaged with said accumulator shift member and selectively engageable with said add and subtract drive elements, means actuated in response to conditioning of said machine for subtracting operation to move said shift control means into engagement with said subtract drive element to move said accumulator to subtract position, a disengageable link actuated with said drive elements and connectable with said shift control means to move said shift control means into engagement with said subtract drive element, and disconnect means actuated by the other of said links connected to said rock shaft and operative in the retracted positive total position of said rock shift to disconnect said disengageable link from said shift control means.

16. In an adding and subtracting machine having a transversely and vertically shiftable accumulator with pairs of intermeshed adding and subtracting gears, a visible dial on each pair of gears, actuating sectors cooperative with said pairs of gears, carry pawls associated with each of said sectors, the carry pawls associated with all but the lowest order sector being positioned to be actuated by lugs on the next lower ordered pair of gears, a right sector carry pawl trip member adapted when actuated between advanced and retracted positions to trip the right carry pawl and introduce a fugitive one into the lowest order pair of gears, left carry pawls actuated by lugs on the highest order pair of gears and connected to advance and retract said trip member, means for vertically reciprocating said accumulator at the end of a total taking operation, means operative in advanced negative total condition of said trip member and conditioned by total taking operation of said machine and movable thereupon under said accumulator to be moved thereby to retract said trip member to starting position upon descending motion of said accumulator, means for shifting said accumulator laterally between add and subtract positions, means responsive to conditioning said machine for adding and subtracting operations for actuating said means for shifting said accumulator laterally, means responsive to conditioning said machine for total taking operation for conditioning said accumulator shifting means to shift said accumulator from add to subtract positions, means responsive to the positioning of said trip member in retracted positive total position to disconnect said last means, and means responsive to conditioning said machine to enter a positive item to independently disconnect the means for shifting the accumulator laterally from add to subtract position.

17. In an adding and subtracting machine having a laterally shiftable accumulator, pairs of intermeshed adding and subtracting gears rotatably mounted on said accumulator, a visible dial on one gear of each pair, an actuating sector coacting with each pair of gears and meshing alternately with the add and subtract gears in the laterally shifted positions of the accumulator, carry pawls cooperative with each sector, said carry pawls having two projections alternately engageable with the add and subtract gears of the pair of gears to the right of the sector with which the pawl is engaged, and lugs on said adding and subtracting gears cooperative with the projections on said pawls, a right carry pawl cooperative with the right sector of the machine, left carry pawls cooperative with the left pair of gears of the machine, and means connecting said right carry pawl with said left carry pawls for operation thereby.

18. In an adding and subtracting machine having a laterally shiftable accumulator, pairs of intermeshed adding and subtracting gears rotatably mounted on said accumulator, a visible dial on one gear of each pair, an actuating sector coacting with each pair of gears and meshing alternately with the add and subtract gears in the laterally shifted positions of the accumulator, carry pawls cooperative with each sector, said carry pawls being alternately engageable with the add and subtract gears of the pair of gears to the right of the sector with which the pawl is engaged, and lugs on said adding and subtracting gears cooperative with said pawls to trip the pawls, a right carry pawl cooperative with the right sector of the machine, left carry pawls cooperative with the left pair of gears of the machine, and means connecting said right carry pawl with said left carry pawls for operation thereby.

References Cited in the file of this patent

UNITED STATES PATENTS

| | | |
|---|---|---|
| 2,302,422 | Crouse | Nov. 17, 1942 |
| 2,371,914 | Rauh | Mar. 20, 1945 |
| 2,550,581 | Mehan | Apr. 24, 1951 |
| 2,655,311 | Pitman | Oct. 13, 1953 |
| 2,665,063 | Frieberg et al. | Jan. 5, 1954 |
| 2,666,574 | Carlson | Jan. 19, 1954 |
| 2,677,499 | Boyden et al. | May 4, 1954 |
| 2,701,100 | Philipp | Feb. 1, 1955 |
| 2,832,533 | Chall | Apr. 29, 1958 |